Oct. 10, 1950  W. F. SPANG  2,525,004
MEAT CUTTING MACHINE
Filed Nov. 23, 1946  4 Sheets-Sheet 1
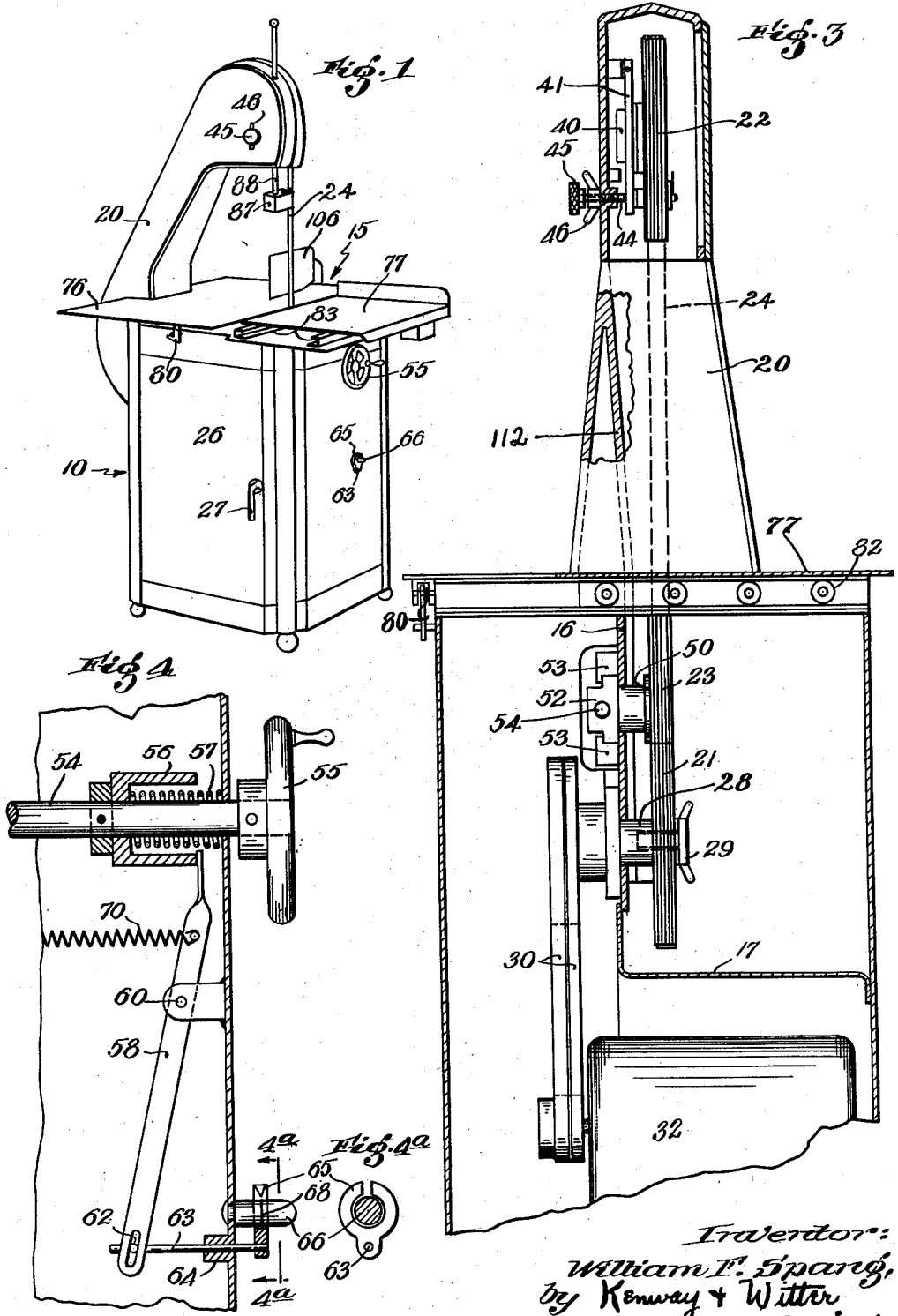
Inventor:
William F. Spang,
by Kenway & Witter
his Attys.

Oct. 10, 1950 — W. F. SPANG — 2,525,004
MEAT CUTTING MACHINE
Filed Nov. 23, 1946 — 4 Sheets-Sheet 2
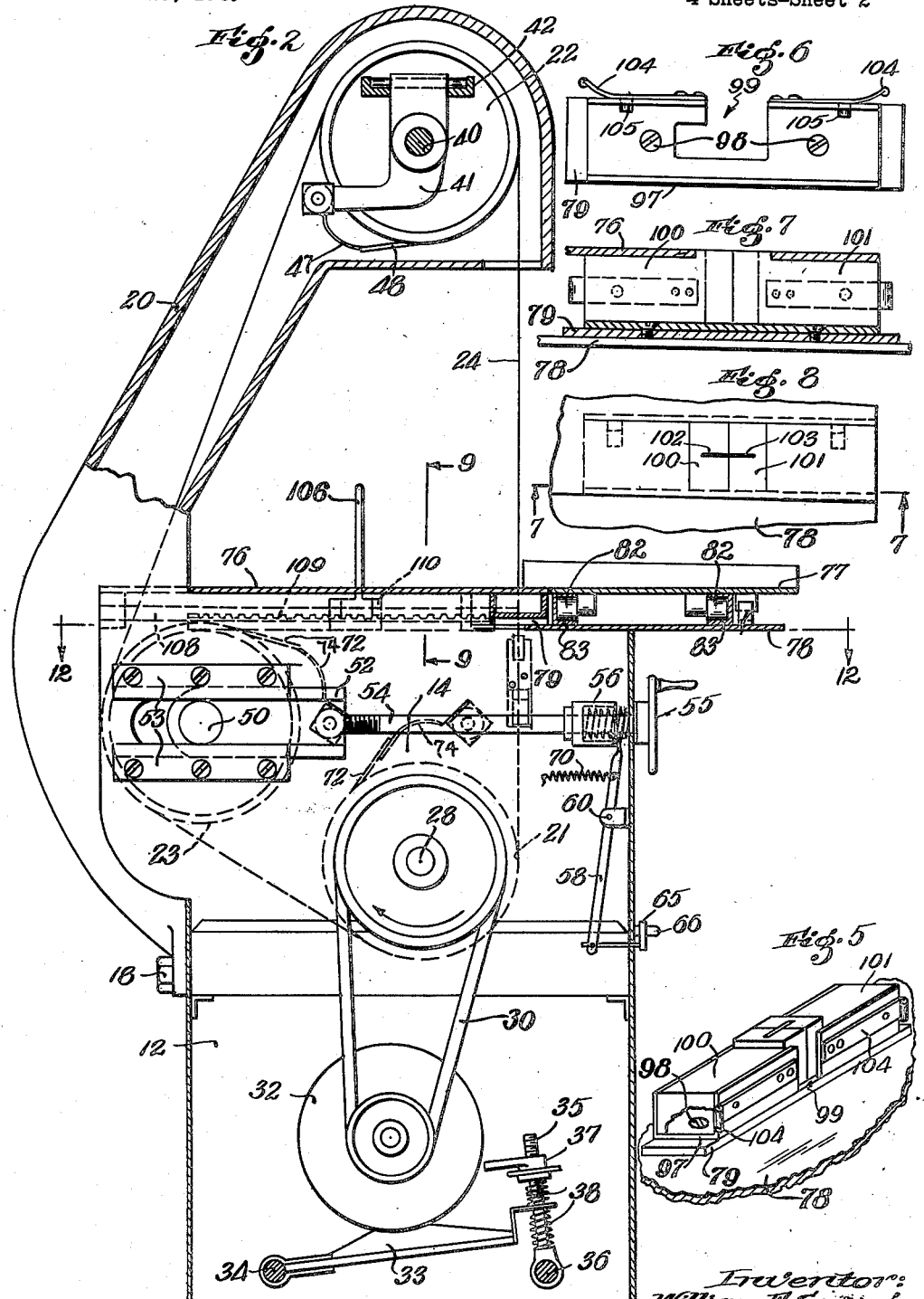

Oct. 10, 1950     W. F. SPANG     2,525,004
MEAT CUTTING MACHINE
Filed Nov. 23, 1946     4 Sheets-Sheet 3
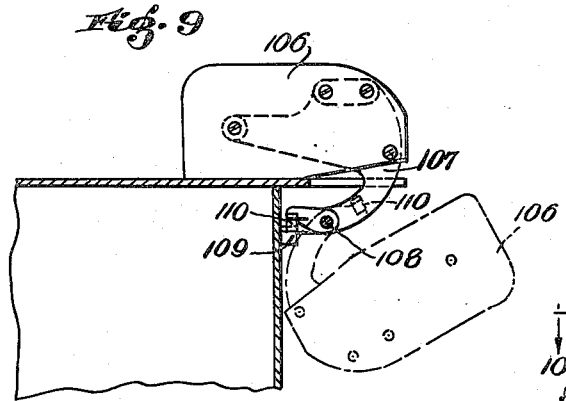
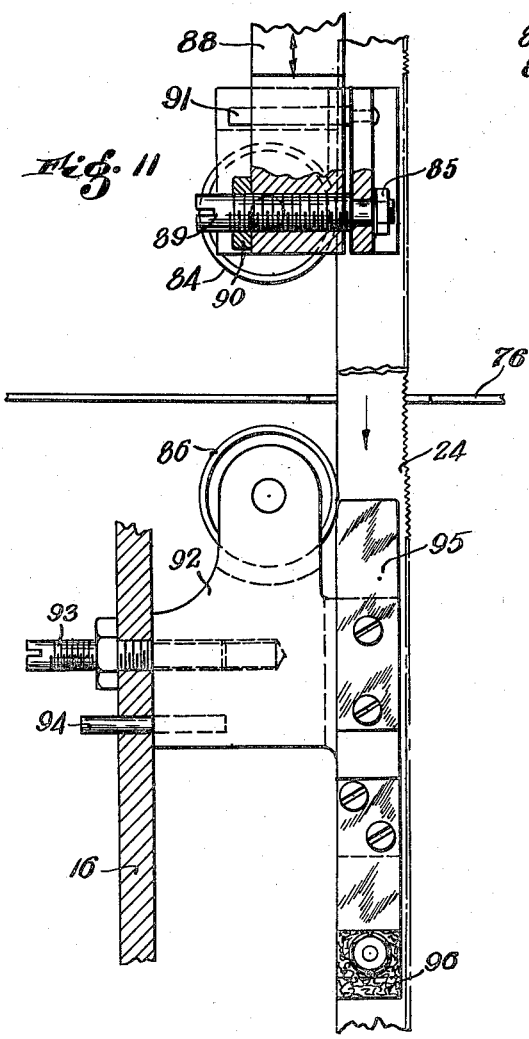
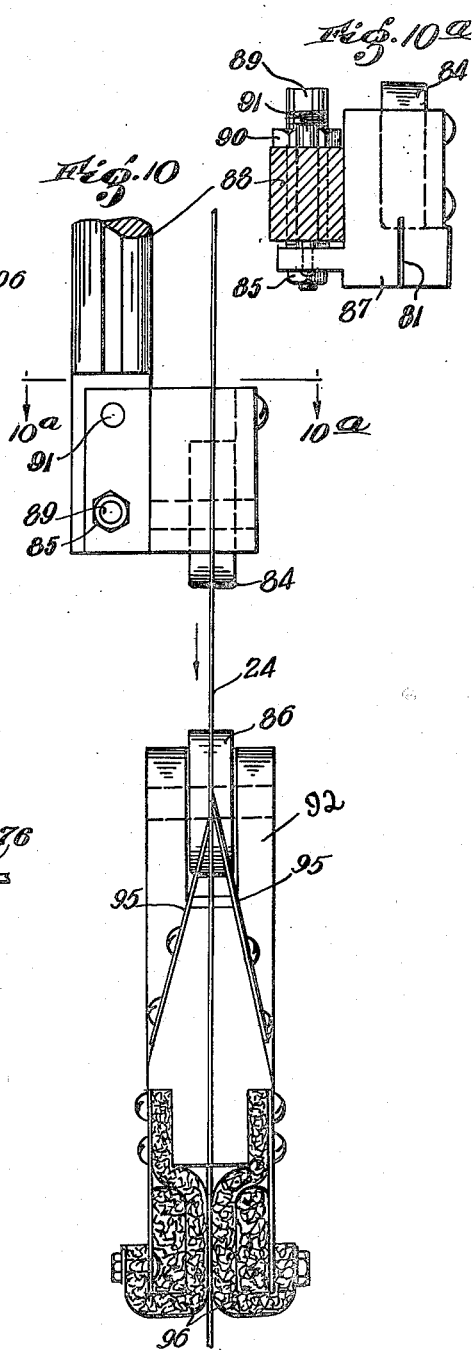

Oct. 10, 1950　　　W. F. SPANG　　　2,525,004
MEAT CUTTING MACHINE

Filed Nov. 23, 1946　　　　　　　　　　4 Sheets-Sheet 4

INVENTOR.
William F. Spang,
BY Kenway & Witter
his Atty's.

Patented Oct. 10, 1950

2,525,004

UNITED STATES PATENT OFFICE 2,525,004

MEAT CUTTING MACHINE

William F. Spang, Milton, Mass., assignor to Cube Steak Machine Co., Boston, Mass., a partnership Application November 23, 1946, Serial No. 711,919

4 Claims. (Cl. 143—27)

This invention relates to a meat cutting machine and more especially to a new and improved meat cutting saw of the endless band type. I am aware that machines of this general nature are not new and the primary object of my invention resides in the production of an improved and more economical machine of this type embodying novel features rendering the machine more efficient for the purpose described.

My invention contemplates a compact base housing adapted to rest on the floor and an associated bracket extending upwardly from the rear portion of the housing to a position above a horizontal table on the housing, and disposed within the housing and bracket are three wheels for supporting the saw in a triangular path providing a deep work accommodating throat and a relatively large table and making possible a more effective control of the saw. Two of the saw supporting wheels are disposed within the base housing and one of these wheels is mounted in a guide and provided with novel means for placing a predetermined tension on the saw. The third wheel is mounted on an arm in the over-hanging bracket and is provided with means for conveniently adjusting the arm and wheel to the most efficient saw supporting position while the machine is in operation. Other novel features which contribute to the more efficient operation of the machine are guide means for the saw at the work supporting table including removable and interchangeable saw guiding blocks, scrapers and wipers for keeping the saw and its supporting wheels clean and an improved slice thickness gauge conveniently adjustable along the table toward and from the saw. The production of an improved meat cutting machine embodying these and other improvements herein disclosed comprises a further object of the invention.

These and other features of the invention will be more readily understood and appreciated from the following detailed description of a preferred embodiment thereof selected for purposes of illustration and shown in the accompanying drawings, in which:

Fig. 1 is a perspective view of a meat cutting machine embodying my invention.

Fig. 2 is an enlarged side elevation broken away to illustrate the interior mechanism.

Fig. 3 is a front elevation, partially broken away.

Fig. 4 is a fragmentary view of the saw tensioning and tension indicating means.

Fig. 4a is a fragmentary detail view of Fig. 4.

Fig. 5 is a fragmentary perspective view of the saw guiding mechanism.

Fig. 6 is a plan view of the saw guide block supporting means.

Fig. 7 is a sectional view taken on 7—7 of Fig. 8.

Fig. 8 is a plan view of the saw guiding mechanism.

Fig. 9 is a fragmentary view of the thickness gauge, taken on line 9—9 of Fig. 2.

Fig. 10 is a fragmentary front elevation of the front reach of the saw and its guiding and cleaning means.

Fig. 10a is a plan view taken on line 10a—10a of Fig. 10.

Fig. 11 is a fragmentary side elevation of the same, partially broken away.

Figure 12:
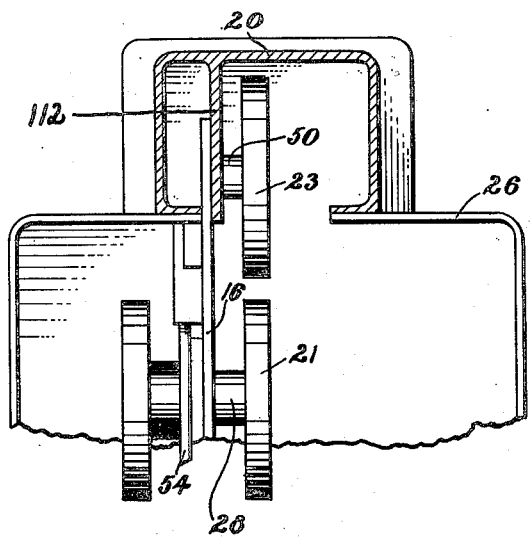
Fig. 12 is a fragmentary plan view taken on line 12—12 of Fig. 2.

My improved meat cutting machine as illustrated in the drawings comprises a base housing 10 adapted to rest on the floor and having therein lower and upper chambers 12 and 14 topped by a horizontal table 15. A vertical wall 16 and partition 17 are disposed in the housing between the two chambers. Secured to the rear face of the housing, as by bolts 18, is a hollow bracket 20 extending upwardly and forwardly to a position above the table. Disposed within the housing and bracket are three wheels 21, 22 and 23 on which is supported in a triangular path a band saw 24 having its front reach extending vertically through the table. The two wheels 21 and 22 are disposed in vertical alignment respectively in the upper chamber 14 of the housing 10 and the top portion of the bracket 20, and the third wheel 23 is disposed in the chamber 14 rearwardly of the wheel 21 and is in engagement with and supports the rear reach of the saw which extends therefrom upwardly through the bracket. The interior of the housing 10 is accessible through a side door 26 provided with a latch handle 27.

The wheel 21 is mounted to rotate in a fixed bearing on the wall 16 in the upper chamber 14 and is secured to its shaft 28 by a lock nut 29. The shaft and wheel are driven by V-belts 30 from a motor 32 in the lower chamber. The motor is supported on a base 33 pivoted at 34. Means including a bolt 35 anchored at 36, together with a nut 37 and springs 38, are provided for pivotally adjusting the base 33 to place the desired amount of driving tension on the belts.

The upper wheel 22 is mounted to rotate on a stud 40 carried by an arm 41 pivotally hung on the shelf 42 rigidly attached to one wall of the bracket 20. The lower end of the arm extends laterally to a position beyond the periphery of the wheel and is engaged by the inner end of a stud 44 threaded through the bracket wall. Rotation of a knurled head 45 fixed to the outer end of the stud is adapted to adjust the arm about its pivot and a lock nut 46 serves to secure the stud in adjusted position. The purpose of this adjustment is to support the wheel 22 in true running position for the saw. The free end of the arm 40 serves the additional function of supporting a spring steel finger 47 carrying on its free end a fibre scraper 48 in contact with the periphery of the wheel. The scraper continuously serves to keep the saw contacting periphery of the wheel clean and the mounting of the scraper on the arm always maintains the scraper in proper contact with the wheel.

The wheel 23 is rotatably supported on a stud 50 carried by a block 52 mounted to slide horizontally in a guideway formed by two plates 53 secured to the wall 16. A shaft 54 threaded into the block 52 extends forwardly of the machine and has a hand wheel 55 fixed to its front end at the front face of the housing 10. A cupped bushing 56 fixed to the shaft is adapted to receive a compression spring 57 disposed on the shaft between the bushing and the front wall of the housing. Expansion of the spring forces the shaft rearwardly and places the saw under tension as will be understood.

It is important that the degree of saw tension shall be predetermined and maintained and the following described mechanism is adapted to cooperate with the bushing and spring for this purpose. A lever 58 pivoted to the frame wall at 60 (Fig. 4) has its top end in contact with the forward end of the bushing. The lower end of the lever has pin and slot connection 62 with a rod 63 slidable longitudinally through the wall at 64. A gauge indicator 65 on the forward end of the rod, outside the housing, cooperates with a pin 66 carried by the housing and having an index mark 68 so located thereon that proper tension is placed on the saw when the index 65 is in alignment with the index mark 68. A tension spring 70 is provided for maintaining the lever 58 in contact with the bushing 56.

It will be apparent that rotation of the hand wheel 55 and shaft 54 in one direction moves the block 52 forwardly along the shaft and rotation in the opposite direction moves the block rearwardly. It will furthermore be apparent that thus moving the block rearwardly places the saw under tension and the spring 57 under compression and that the amounts of such tension and compression increase as the shaft and bushing are moved forwardly and the spring 57 compressed. Such forward movement of the shaft is measured by the mechanism of lever 58 and the index mark 68 is so located that the proper tension is placed on the saw when the index 65 aligns with the mark.

The saw contacting peripheries of the wheels 21 and 23 are kept clean by fibre scrapers 72 held in contact with the wheels by resilient fingers 74, one such finger being mounted on the block 52 and the other being mounted on the wall 16. The scraper 72 on the block 52 always follows the wheel 23 when the block is adjusted and maintains the scraper in proper contact with the wheel. The maintaining of clean wheels is furthermore facilitated by grooving the peripheries of the wheels circumferentially as indicated in Fig. 3.

The table 15 comprises a rear fixed portion 76 and a forward movable portion 77, both supported on the horizontal top wall 78 of the housing 10. The table portion 76 is removable and is normally secured in fixed position by latches, one of which is illustrated at 80. The table portion 77 is carried on anti-friction rolls 82 mounted to travel in U-shaped tracks 83 on the top wall 78 and is movable thereon along the table portion 76. The front reach of the saw extends vertically through the table between the portions 76 and 77 and is guided by rolls 84 and 86 engaging the rear edge of the saw respectively above and beneath the table (Figs. 10 and 11). The roll 84 is carried on a block 87 secured to the bottom end of a rod 88 mounted for vertical adjustment in the top end of the bracket 20, the block being slotted at 81 to receive the saw. The block and roll are adjustable toward and from the saw by means of a screw 89 journaled to the block and secured by a nut 85 and can be held in adjusted position by a lock nut 90. A dowel pin 91 cooperates with the screw to support the block on the rod. The roll 86 is mounted on a block 92 fixed to the wall 16 by a bolt 93 and dowel 94 (Fig. 11). Two resilient fingers 95 carried by the block engage the opposite faces of the saw and serve to scrape it clean during the meat cutting operation. Soft cleaning pads 96 also carried by the block serve to wipe the saw after it passes the cleaning fingers.

My improved machine contemplates the employment of further saw guiding means mounted in the table for directly taking the working rearward and forward thrusts of the saw. This means comprises a guide block supporting frame 97 secured to a spacer plate 79 on the top plate 78 by screws 98. This frame is relatively long, U-shaped in cross section and its center portion is cut away at 99 to accommodate the saw. The frame is adapted to receive and support two saw guiding blocks 100 and 101 in abutting relation and provided with juxtaposed and aligned slots 102 and 103 for receiving the saw. The table plate 76 rests on the frame over the blocks and is cut away adjacent to the slots 102 and 103. The block 100 for engaging the rear portion of the saw is of steel and the block 101 forwardly of the cutting edge of the saw is of fibre. Leaf springs 104 fixed to the block carry detent pins 105 for engaging and holding the blocks in place in the frame.

The meat to be cut is supported on the carriage 77 and the thickness of slice cut by the saw can be accurately gauged by supporting the meat in contact with a gauging plate 106 disposed vertically over the table portion 76. The plate 106 is supported on an arm 107 mounted for pivotal and sliding movement on and along a rod 108 attached to the housing 10. A toothed rack 109 parallel with and disposed inwardly of the rod is adapted to receive and cooperate with a toothed segment 110 of the arm and hold the plate fixed when it is in working position on the table. The plate is freely adjustable along the rod when pivoted upwardly sufficiently to disengage the segment 110 from the rack.

The simple and economical design of my improved meat cutting machine and its convenient and efficient operation are believed apparent. The triangular supporting of the saw 24 not only eliminates bulky overhead construction but provides a deep work-accommodating throat between the saw and bracket 20 and a large fixed table portion 76 for receiving and supporting stacks of cut slices. The maintaining of proper saw tension is also conveniently and efficiently effected by my improved adjusting and indicating mechanism in association with the third saw supporting wheel 23, and the employment of the third wheel for the saw tensioning function very substantially reduces the bearing pressures which would otherwise be placed on and required of the saw supporting wheels 21 and 22. The adjustable mounting of the top wheel 22 and its adjustment through rotation of the knurled head 45 serves to maintain the saw in true running alignment through the guide blocks 100 and 101. These blocks are disposed directly beneath and adjacent to the meat cutting position where the block 100 takes the rear thrust of the saw during the cutting operation and the block 101 prevents follow-up forward movement of the saw when the meat is removed. The provision of means permitting convenient removal and replacement of these blocks and the maintaining of a clean saw and saw supporting rolls add substantially to the efficient operation of the machine as also does the work guiding plate 106 which is freely adjustable along the rod 108 when slightly lifted from the table.

My improved construction herein disclosed compactly and conveniently mounts most of the operating mechanism in a heavy base housing unit well adapted to provide a firm and rugged support for a relatively light weight top portion including the hollow bracket 20 secured to the rear of the base housing and providing a deep cutting throat with free operating space on and above the tables 76 and 77. The partition wall 16 extends vertically from front to rear through the base housing unit and serves to bind the front and rear walls and the top wall 78 into a rigid unit. The partition furthermore serves to support the shaft 28 and guide 53 together with their cooperating mechanism and to provide a separating wall between the saw and driving mechanism. The bracket 20 is provided with an integral partition 112 arranged (Fig. 12) to cooperate with the partition 16 in continuing the separating wall upwardly within the bracket. The barrier formed by these partitions, together with the partition 17 above and extending about the motor 32, keeps meat particles from entering the saw driving chamber where they would contaminate the driving mechanism, and permits cleaning and flushing of the saw chamber independently of the driving mechanism chamber. The heavy base unit construction provides a suitable housing and table support and gives the machine a low center of gravity and rugged stability.

Having thus disclosed my invention what I claim as new and desire to secure by Letters Patent is:

1. A meat saw comprising a base housing, a horizontal table thereon, a bracket carried by and extending upwardly and forwardly from the rear portion of the housing to a position above the table, two band saw supporting wheels carried respectively in the housing and the top portion of the bracket, a band saw on the wheels and having its front reach extending vertically through the table, a third wheel in the housing rearwardly of the first named wheel therein and in engagement with and supporting the rear reach of the saw which extends therefrom upwardly through the bracket, and means including an adjusting element located forwardly of the front face of the housing and beneath the table for adjusting the third wheel rearwardly to tighten the saw.

2. The combination defined in claim 1 plus a guide for supporting the third wheel in the housing for movement forwardly-rearwardly, said means including a shaft extending from the guide forwardly through the housing, a spring cooperating with the shaft for resisting the forward thrust of the wheel in the guide, and means cooperating with the shaft for indicating forwardly of the front face of the housing and beneath the table the longitudinal movement of the shaft against the spring.

3. A meat cutting machine comprising a base housing, a horizontal table on the housing including a rear fixed portion and a forward horizontally movable portion, a vertical partition secured rigidly to the walls of the housing and extending forwardly-rearwardly therethrough and dividing the housing into two chambers, a hollow bracket attached to the rear of the base housing and extending upwardly and forwardly over the table, a band saw having a forward reach extending vertically through the table, three wheels supporting the saw in a triangular path including a reach extending through the hollow bracket, one wheel being carried by the bracket above the table and the other two wheels being supported on the partition beneath the table in one of said chambers, means in the other chamber for driving one of said two wheels, and means including an adjusting wheel beneath the table and forwardly of the front face of the base housing for adjusting the other of said two wheels forwardly-rearwardly of the machine.

4. The combination defined in claim 1 in which said means includes a shaft connected to said adjusting element and extending rearwardly therefrom in the housing and into adjusting relation with said third wheel, and means associated with said shaft for indicating the tensioning of the saw forwardly of the front face of the housing and beneath the table.

WILLIAM F. SPANG.

REFERENCES CITED

The following references are of record in the file of this patent:

UNITED STATES PATENTS

| Number | Name | Date |
| --- | --- | --- |
| 120,949 | Doane et al. | Nov. 14, 1871 |
| 339,539 | Esplin | Apr. 6, 1886 |
| 423,063 | Lindsay | Mar. 11, 1890 |
| 478,148 | Wentz | July 5, 1892 |
| 640,502 | Thomas | Jan. 2, 1900 |
| 869,309 | Kramer | Oct. 29, 1907 |
| 928,133 | Keighley | July 13, 1909 |
| 931,894 | Spayd | Aug. 24, 1909 |
| 1,258,517 | Woods et al. | Mar. 5, 1918 |
| 1,392,990 | Vaughan | Oct. 11, 1921 |
| 1,427,661 | Walker | Aug. 29, 1922 |
| 1,704,428 | Dempewolf et al. | Mar. 5, 1929 |
| 1,793,461 | Biro | Feb. 24, 1931 |
| 1,803,489 | Schueren | May 5, 1931 |
| 1,870,774 | Gaines | Aug. 9, 1932 |
| 1,872,656 | Bleam | Aug. 23, 1932 |
| 1,967,724 | Ponton | July 24, 1934 |
| 2,081,033 | Biro | May 18, 1937 |
| 2,274,923 | Hedgpeth | Mar. 3, 1942 |
| 2,280,621 | Biro | Apr. 21, 1942 |
| 2,311,762 | Kottmann et al. | Feb. 23, 1943 |
| 2,380,700 | Lasar | July 31, 1945 |
| 2,423,363 | Biro | July 1, 1947 |
| 2,492,824 | Ahrndt et al. | Dec. 27, 1949 |

FOREIGN PATENTS

| Number | Country | Date |
| --- | --- | --- |
| 300,680 | Great Britain | Nov. 19, 1928 |
| 317,214 | Italy | Apr. 27, 1934 |
| 722,001 | France | Dec. 28, 1931 |